Patented May 14, 1940

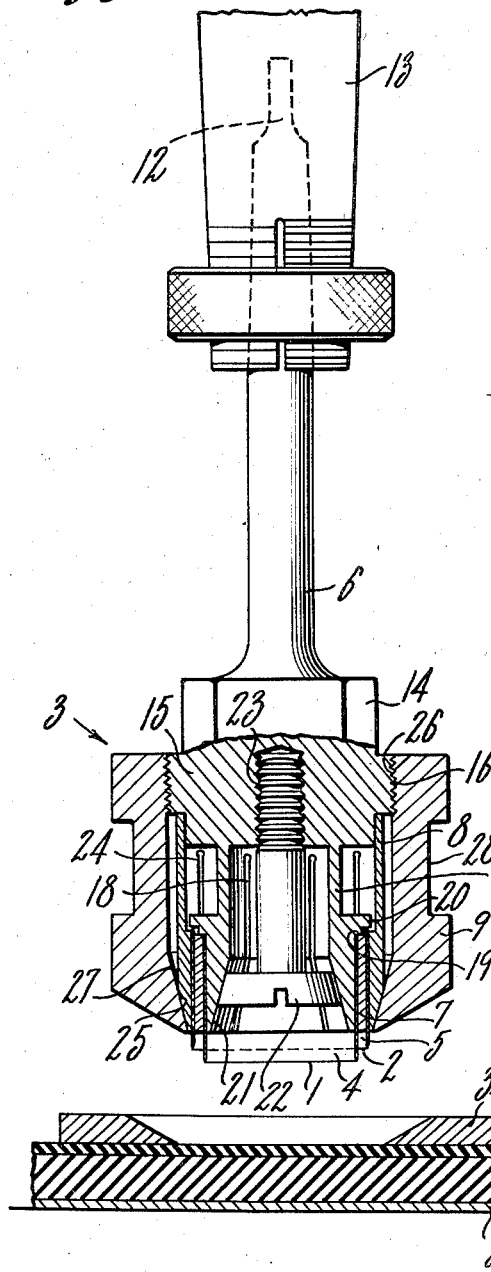
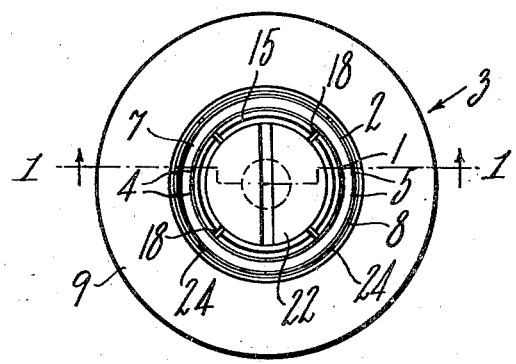
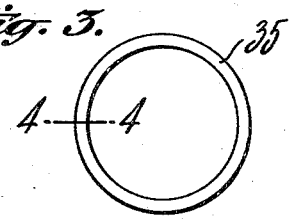

2,200,730

UNITED STATES PATENT OFFICE 2,200,730

ROTARY CUTTER

Hugh Molleson Smallwood, New York, N. Y., and Harold Taylor Battin, Ridgewood, N. J., assignors, by mesne assignments, to United States Rubber Company, New York, N. Y., a corporation of New Jersey Application September 17, 1937, Serial No. 164,322

5 Claims. (Cl. 164—60)

This invention relates to rotary cutters, and particularly to rotary cutters for cutting rings having rectangular cross-sections from sheets or slabs of rubber or other soft or resilient material. It is especially adapted to cut out uniform rings of rubber for testing purposes.

In testing the durability and stretching properties of rubber, it is the practice to place rubber rings of uniform diameter and cross-section in a stress-strain testing machine, to stretch them either to a fixed elongation or until they break, and to record continuously or at intervals the force applied. It is of the utmost importance that each ring be of as nearly perfect rectangular cross-section as possible to insure regularity and uniformity in the test pieces for the sake of an accurate determination of the properties of the rubber being tested. In the past these rings have been punched out or cut out by punches or dies which had comparatively thick cutting edges or blades. The result was that, due mainly to the resiliency of the rubber beneath the thick edge presented to it, the cross-section of the ring would deviate considerably from a perfect rectangle, so that the modulus of the rubber was determined incorrectly because the area of cross-section was not known accurately. Since the extent of these deviations from rectangular cross-section depended on the properties of the material, it was not possible even to obtain accurate relative values of modulus when comparing materials of differing physical properties.

The present invention provides a rotary cutter which comprises a chuck which is adapted to hold extremely thin and sharp blades in perfect concentric relationship. This cutter may be fitted in a drill press to cut out test rings of rubber of which the cross-section is very nearly a perfect rectangle. It is simple, efficient, rapid and inexpensive in operation. The cutting edges comprise preferably safety razor blades of the uniformly thin and normally flat "Gillette" type held securely in perfect circular relationship, and may be easily replaced upon dulling.

A present preferred embodiment of the invention is illustrated in the drawing in which:

Fig. 1 is an elevational view, partly in cross-section, taken along section line 1—1 of Fig. 2, of the rotary cutter mounted in a drill press and about to be applied to a slab of rubber on a base;

Fig. 2 is a bottom plan view of the cutter;

Fig. 3 is a plan view of a test piece of rubber cut out by the cutter;

Fig. 4 is a cross-sectional view taken along section lines 4—4 of Fig. 3, slightly enlarged.

Referring particularly to Figs. 1 and 2, the rotary cutter comprises generally inner and outer thin cutting edges 1 and 2 respectively arranged in concentric circular relationship and removably secured in a chuck 3. The inner cutting edge 1 comprises one or more thin blades 4, each blade describing an arc of a circle, the number of blades depending on the circumferential size of the cutting edge. The outer cutting edge 2 similarly comprises one or more thin blades 5. The blades are preferably flexible safety razor blades of the "Gillette" type, which are arcuately bent and fitted into the chuck 3 to form arcs of perfect circles. These blades 4 and 5 have no excessively thickened parts, are of the order of .0065 inch in thickness and are sharpened at their outer edges 1 and 2. The cutting edge 1 extends beyond and below the cutting edge 2 in order that the inner cut of the finished ring may be completed before the outer edge of the ring is cut through.

The chuck 3 comprises a central shaft 6, an annular spacer 7, an outer clamping sleeve 8, and a barrel 9. One end 12 of shaft 6 is tapered for fitting in a drill press 13. At the other end of the shaft 6 is an integral nut 14 beyond which extends an integral hollow cutter head 15 externally threaded at its upper portion 16. The cutter head 15 has radially extending slots 18 to provide flexibility for its open end, while centrally positioned circumferential flanges 19 and 20 extend externally to receive the inward edges of the blades 4 and 5, respectively. The flanges thus serve as stops to fix the relative axial positions of the blades and to fix the extent by which the cutting edges project below the holder. The outer or lower end of the cutter head 15 is internally beveled at 21 to receive the tapered head of a bolt 22 which fits into screw threads 23 provided in the base of the cutter head. The sleeve 8 has longitudinal slots 24 extending from its outer end to provide flexibility for that end, the exterior of which is beveled at 25. One end of the barrel 9 is interiorly threaded at 26 and the other end interiorly beveled at 27 to cooperate with the exterior bevel of the sleeve 8. A recess 28 around the exterior of the barrel 9 accommodates a wrench for tightening the screw threads 16 of the barrel 9 on the threads 26 of the cutter head 15.

A sheet or slab 30 of rubber or other material to be cut by the rotary cutter may be placed upon a cushion 31 of resilient material such as rubber or cork, the cushion 31 in turn being mounted upon a base 32 of wood, metal or other rigid material. A retaining ring 34, interiorly beveled, serves to hold the sheet 30 in position during the cutting operation, to be described below. A ring 35 as shown in Figs. 3 and 4 is the result of the rotary cutter acting upon the sheet 30.

Before inserting the razor blades 4 and 5 into the chuck 3, the chuck is inverted so that the cutter head 15 is upward and the bolt 22 and barrel 9 are partially backed away by unscrewing them from their tightened position with respect to the cutter head. The open ends of the cutter head 15 and the clamping sleeve 8 are then in their normal positions so that the spacer 7 lies loosely in the circular slot between them. The blades 4 are then bent and inserted in the space between the cutter head 15 and the inner surface of the spacer 7 so that their interior edges abut the flange 19. Similarly the blades 5 are inserted between the outer surface of the spacer 7 and the inner surface of the clamping sleeve 8 so that their interior edges abut the flange 20. For the sake of ease in inserting the blades, it is desirable that the circular slots into which they are fitted be of such circumferential dimensions that the blades do not abut each other, so that there is a slight gap between the ends of adjacent blades. The bolt 22 is then tightened so that its beveled head presses against the interior beveled edge of the slotted cutter head 15, holding the blades 4 in rigid cylindrical relationship with the interior surface of the spacer 7. The barrel 9 is likewise screwed tightly so that its interior beveled end 27 presses against the exterior beveled end 25 of the slotted clamping sleeve 8 to hold the blades 5 in tight conformity with the exterior cylindrical surface of the spacer 7. It is thus ensured that the cutting edges of the separate blades in each circle track perfectly, describing perfect coinciding circles when the cutter is rotated. During the tightening operation, the slots 18 and 24 permit the cutter head 15 and the clamping sleeve 8 to yield sufficiently to adjust the blades in accurate circular relationship around the spacer 7. The rotary cutter is then in condition for operation upon the sheet 30. When the blades have become dulled or are to be removed or replaced for other reasons, the above process may be reversed by loosening the bolt 22 and the barrel 9 and removing the blades by hand.

The cutting operation is performed by first inserting the tapered end 12 of the shaft 6 into the drill press 13, and lubricating the blades, for example, with a soap solution.

The cutter is then rotated and gradually brought down upon the sheet 30 of the material to be cut as it rests upon the soft cushion 31. As the cutting edge 1 comes in contact with the sheet 30, the retaining ring 34 is held by manual or other means against the upper surface of the sheet to keep it from rotating with the cutter.

Since the cutting edge 1 extends below the cutting edge 2, the interior disc of rubber is first completely severed from the sheet 30 before the outer periphery of the ring 35 is completely severed. Thus the ring cannot revolve until it is entirely cut out.

A function of the soft cushion 31 is to permit the entry of the cutting edges into it as the cuts are completed, thus preventing damage to the blades. After the cutting operation has taken place, the cutter is again raised and the finished ring 35 removed.

The ring 35 as shown in Figs. 3 and 4 is a perfect annulus and its cross-section is almost perfectly rectangular. In contrast to the use of thicker blades which would distort the rubber before the cut has been completed, the extremely thin razor blades employed in the present invention effect a clean cut without substantial distortion of the rubber beneath the cutting edges. The result is smooth, cylindrical inner and outer surfaces for the ring.

It has been found that rubber and other materials of widely varied physical properties can be accurately cut with this tool. Its accuracy is such that variations in the widths of rings produced by it are limited to .001 inch each way. Throughout a series of approximately 50 test pieces it was found that the average standard deviation of the cross-sectional area, measured in the plane of the ring, was only a little over 1%.

While we have shown and described a certain present preferred embodiment of the present invention, it is obvious that modifications may be made in the disclosed embodiment without departing from the spirit thereof and the scope of the appended claims.

Having thus described our invention, what we claim and desire to protect by Letters Patent is:

1. A rotary cutter comprising a chuck, an outer thin substantially circular cutting edge, and an inner thin substantially circular cutting edge concentric with and extending beyond said outer cutting edge.

2. A rotary cutter comprising a chuck, concentric substantially circular cutting edges, each of said edges comprising a plurality of normally flat and arcuately bent thin blades, and means for removably securing said cutting edges relative to said chuck.

3. A rotary cutter comprising a plurality of normally flat blades having a thickness of the order of .0065 inch, a cylindrical spacer, and means for removably securing said blades in arcuate position against the inner and outer surfaces of said spacer, so that said blades will present two concentric substantially circular cutting edges.

4. In combination, a rotary cutter having inner and outer thin concentric substantially circular cutting edges, the inner of said edges extending beyond the outer edge, a cushioned base for supporting a sheet of material to be cut, and a retaining ring for holding said sheet in position.

5. A rotary cutter comprising a chuck having concentric circular slots, a plurality of adjacent safety razor blades arcuately fitting within and projecting from each of said slots, and clamping means for securing said blades within said slots, the circumferential dimensions of said slots relative to the length of said blades being such as to leave a gap between the ends of adjacent blades.

HUGH MOLLESON SMALLWOOD.
HAROLD TAYLOR BATTIN.